J. N. ARVIN.
NUT-LOCK.

No. 178,260.  Patented June 6, 1876.

Witnesses:
P. C. Dieterich.
F. H. Duffy.

Inventor:
John N. Arvin
Per: C. H. Watson & Co. Attorneys.

UNITED STATES PATENT OFFICE.

JOHN N. ARVIN, OF VALPARAISO, INDIANA, ASSIGNOR OF TWO-THIRDS HIS RIGHT TO ROBERT LEARMOUTH, OF ALLIANCE, OHIO, AND DAVID E. SIMONS, OF VALPARAISO, INDIANA.

IMPROVEMENT IN NUT-LOCKS.

Specification forming part of Letters Patent No. 178,260, dated June 6, 1876; application filed March 27, 1876.

*To all whom it may concern:*

Be it known that I, JOHN N. ARVIN, of Valparaiso, in the county of Porter and State of Indiana, have invented certain new and useful Improvements in Nut-Locks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to devices for locking two nuts at one time; and it consists in a hinged drop-bar, having its ends bent at right angles to fall down against the inner sides of two nuts and lock the same, as will be hereinafter more fully set forth.

Figure 1:
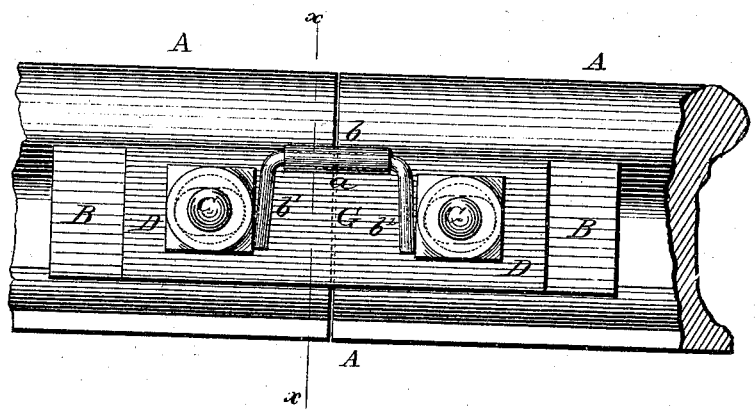
Figure 2:
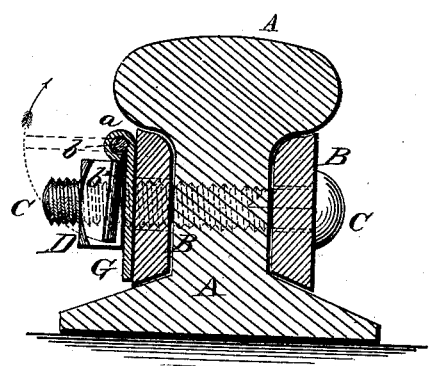
Figure 3:
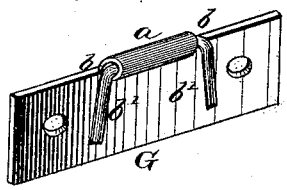

In the annexed drawing, Figure 1 is a side elevation of a railroad-joint embodying my invention. Fig. 2 is a cross-section of the same through the line $x$ $x$, Fig. 1. Fig. 3 is a perspective view of a plate or washer with my drop-bar hinged thereto.

A A represent the ends of two adjacent railroad-rails. B B are the ordinary fish bars; C C, the bolts, and D D the nuts thereon. On the ends of the bolts C, before the nuts D are screwed thereon, is placed a plate or washer, G, held close to the fish-bar by the nuts. The upper edge of this plate or washer is cut and bent to form a longitudinal tube, $a$, in the center, and through the same is passed a bar, $b$. The ends of this bar are bent at nearly right angles, forming two parallel arms or legs, $b'$ $b'$. The bar $b$ drops down after the nuts D D have been screwed up, so that the two arms $b'$ will come close against the inner sides of the nuts, and thereby lock them in place, the legs $b'$ $b'$ being inclined slightly outward, and, being spring-legs, are pressed inward when the nuts D are turned up, and fixed between the nuts, thus holding the nuts securely in position, and the spring-pressure of the legs prevents the bar $b$ from getting out of place.

This nut-lock is very simple, the drop-bar having only two bends, and, falling down between the two nuts, locks them both.

If desired, the plate G may be dispensed with, and the drop-bar hinged in any suitable manner to the fish-bar, rails, or other piece through which the nuts pass.

I am aware that it is not new to use a hinged bent clasp to secure a nut, the clasp having four bends and inclosing three sides of the nut, and I do not claim such as my invention; but in my invention the arms only have two bends, and at the same time hold two nuts securely in position, thus requiring but two-thirds of the metal to hold two nuts that has heretofore been used to hold one nut, and at the same time requiring less labor to construct it.

Having thus fully described my invention, what I claim as new, and desire to secure by Letters Patent, is—

The hinged drop-bar $b$, bent as described, and having the spring-legs $b'$ $b'$, in combination with the nuts D D and bolts C C, fish-bar and rails, whereby the bar $b$ holds the two nuts securely, and is retained in place by the spring-legs, substantially as and for the purpose set forth.

In testimony that I claim the foregoing as my own I affix my signature in presence of two witnesses.

JOHN N. ARVIN.

Witnesses:
   WILL. H. BUELL,
   G. C. BULL.